(12) United States Patent
Kjellin et al.

(10) Patent No.: US 8,460,788 B2
(45) Date of Patent: *Jun. 11, 2013

(54) SYNTHETIC NANO-SIZED CRYSTALLINE CALCIUM PHOSPHATE AND METHOD OF PRODUCTION

(75) Inventors: Per Kjellin, Göteborg (SE); Martin Andersson, Västra Frölunda (SE)

(73) Assignee: Promimic AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,482

(22) Filed: May 30, 2012

(65) Prior Publication Data

US 2012/0282457 A1     Nov. 8, 2012

Related U.S. Application Data

(62) Division of application No. 11/629,215, filed as application No. PCT/SE2005/000896 on Jun. 14, 2005, now Pat. No. 8,206,813.

(30) Foreign Application Priority Data

Jun. 15, 2004 (SE) ..................................... 0401524

(51) Int. Cl.
    *B32B 5/16*          (2006.01)
    *B05D 3/02*          (2006.01)
    *B82Y 30/00*        (2011.01)
    *B82Y 40/00*        (2011.01)

(52) U.S. Cl.
USPC ........... 428/330; 428/220; 427/380; 977/773; 977/890

(58) Field of Classification Search
USPC ........................................................... 428/220
See application file for complete search history.

(56) References Cited

U.S. PATENT DOCUMENTS

| | | | |
|---|---|---|---|
| 6,012,591 A | | 1/2000 | Brandenberg |
| 6,013,591 A | * | 1/2000 | Ying et al. ...................... 501/1 |
| 6,033,780 A | | 3/2000 | Nishioka et al. |

(Continued)

FOREIGN PATENT DOCUMENTS

| | | |
|---|---|---|
| EP | 0 942 045 A1 | 9/1999 |
| EP | 0942045 A1 | 9/1999 |

(Continued)

OTHER PUBLICATIONS

Ohashi Yoshio, Experimental study on bone growth around titanium implants coated with ultra thin pulse laser-deposited hydroxyapatite; Apr. 14, 2005; Journal of the Osaka Odontological Society, vol. 68, No. 1, pp. 79-91.*

(Continued)

*Primary Examiner* — Maria Veronica Ewald
*Assistant Examiner* — Tahseen N Khan
(74) *Attorney, Agent, or Firm* — Myers Bigel Sibley & Sajovec, P.A.

(57) ABSTRACT

Synthetic nano-sized crystalline calcium phosphate, particularly hydroxyapatite, having a specific surface area in the range of 150 $m^2$/g to 300 $m^2$/g, is described. The nano-sized crystalline calcium phosphate may be in the form of a powder or in the form of a coating on a surface. A method of producing a nano-sized crystalline calcium phosphate powder or coating is also described.

10 Claims, 4 Drawing Sheets

U.S. PATENT DOCUMENTS

| | | |
|---|---|---|
| 6,428,803 B1 | 8/2002 | Ewers et al. |
| 2002/0155144 A1 | 10/2002 | Troczynski et al. |
| 2002/0156529 A1 | 10/2002 | Li et al. |

FOREIGN PATENT DOCUMENTS

| | | |
|---|---|---|
| EP | 142 1954 A1 | 5/2004 |
| EP | 1421954 A1 | 5/2004 |
| RU | 2077475 | 9/1994 |
| WO | 0202461 A1 | 1/2002 |
| WO | WO 02 02461 A1 | 1/2002 |

OTHER PUBLICATIONS

Massafumi Uota, et al., "Synthesis of High Surface Area Hydroxyapatite Nanoparticles by Mixed Surfacant-Mediated Approach", Langmuir, 2005, vol. 21, pp. 4724-4728.

Chun-Wei Chen, et al., "Mechanochemical-hydrothermal synthesis of hydroxyapatite from nonionic surfactant emulsion precursors", Journal of Crystal Growth, 2004, vol. 270, pp. 615-623.

Wojciech L., et al., "Preparation of magnesium-substituted hydroxyapatite powders by the mechanochemical-hydrothermal method", Biomaterials, 2004, vol. 25, pp. 4647-4657.

Susmita Bose, et al., "Synthesis and Characterization of Hydroxyapatite Nanopowders by Emulsion Technique", Chem. Mater., 2003, vol. 15, pp. 4464-4469.

George C. Koumoulidis, et al., "Preparation of hydroxyapatite via microemulsion route", Journal of Colloid and Interface Science, 2003, vol. 259, pp. 254-260.

Massafumi Uota, et al,, "Synthesis of High Surface Area Hydroxyapatite Nanoparticles by Mixed Surfacant—Mediated Approach," Langmuir, 2005, vol. 21, pp. 4724-4728.

Chun-Wei Chen, at al., "Mechanochemical-hydrothermal synthesis of hydroxyapatite from nonionic surfactant emulsion precursors", Journal of Crystal Growth, 2004, vol. 270, pp. 615-623.

Wojciech L et al., "Preparation of magnesium-substituted hydroxyapatite powders by the mechanochemical hydrothermal method," Biomaterials, 2004, vol. 25, pp. 4647-4657.

Susmita Bose, et al., "Synthesis and Characterization of Hydroxyapatite Nanopowders by Emulsion Technique," Chem. Mater., 2003, vol. 15, pp. 4464-4469.

George C. Koumoulidis, et al., "Preparation of hydroxyapatite via microemulsion route," Journal of Colloid and Interface Science, 2003, vol. 259, pp. 254-260.

Yoshio "Experimental study on bone growth around titanium implants coated with ultra thin pulse laser-deposited hydroxyapatite", *Journal of the Osaka Odontological Society* 68(1):79-91 (2005).

\* cited by examiner

SYNTHETIC NANO-SIZED CRYSTALLINE CALCIUM PHOSPHATE AND METHOD OF PRODUCTION

CROSS REFERENCE TO RELATED APPLICATIONS

This application is a divisional of and claims priority to U.S. application Ser. No. 11/629,215, filed Dec. 17, 2007 now U.S. Pat. No. 8,206,813, now allowed, which is a 35 U.S.C. §371 national stage application of PCT Application No. PCT/SE05/00896 filed on Jun. 14, 2005, which claims priority from Swedish Application No. 0401524-4 filed on Jun. 15, 2004, the contents of each of which are incorporated herein by reference in their entireties. The above-referenced PCT Application was published as International Publication No. WO 2005/123579A1 on Dec. 29, 2005.

The present invention relates to synthetic crystalline calcium phosphate, in particular hydroxyapatite, with a specific surface area in the range of 150 m$^2$/g to 300 m$^2$/g, and to a method of producing a powder or coating of nano-sized crystalline calcium phosphate, in particular hydroxyapatite.

BACKGROUND OF THE INVENTION

There exists a vast flora of different biomaterials that can be implanted in the body. These can be categorized according to their in vivo activity as bioinert, resorbable or bioactive materials. Bioinert materials are in a sense seen as foreign objects when they come in contact with living tissue. The body encapsulates the object with thin tissue and hence mechanically fixates the object within the body. Typical bioinert materials are ceramics, such as aluminium oxide and zirconium dioxide and different non-biodegradable polymers. Bioresorbable materials such as tricalcium phosphate, calcium sulfate and biodegradable polymers are used to replace damaged tissue. These are eventually dissolved and replaced by body tissue. Bioactive materials include, for example, hydroxyapatite and some glass and glass-ceramics and are characterized by their ability to initiate a biological response, leading to a chemical and biological binding to the living tissue.

Osseointegration, meaning the integration of an implant for repairing or replacement of hard tissues in a body and the surrounding biological tissue, i.e. bone, is decisive for the success of the implantation procedure. A deficient osseointegration may lead to implant detachment. There are several methods to achieve good osseointegration, for example a) implant design, such as the distance between the threads on dental implant screws (Wennerberg, A., et al., "Design And Surface Characteristics Of 13 Commercially Available Oral Implant Systems," International Journal of Oral & Maxillofacial Implants, vol. 8, No. 6, pp. 622-623 (1993); Wennerberg A, Albrektsson T, Lausmaa J. Torque and histomorphometric evaluation of c.p. titanium screws blasted with 25- and 75-microns-sized particles of Al2O3. *J Biomed Mater Res* 1996; 30: 251-260, and U.S. Pat. No. 4,330,891 to Branemark, et al.), b) tuning of the implant surface topography (Larsson et al, "Implant element" U.S. Pat. No. 6,689,170), c) selecting the right surface chemistry (Ellingsen et al, "Process for treating a metallic surgical implant" U.S. Pat. No. 5,571,188) (R. G. T. Geesink, Clin. Orthop. 261 (1990) 39-58; J. A. Jansen, et al., Mater. Res., 25 (1991) 973-989; T. W. Bauer, et al., Bone Join Surg., 73A (1991) 1439-1452; Rashmir-Raven A M, Richardson D C, Aberman H M, DeYoung D J. The response of cancellous and cortical canine bone to hydroxyapatite-coated and uncoated titanium rods. *J Appl Biomater* 1995; 6: 237-242.), either bioinert, resorbable or bioactive, and d) a combination of two or all three of a) to c). The driving force for studying osseointegration and its mechanisms is that the patients receiving implant surgery often have to experience a long healing period. Dental titanium implants, for example, typically require a healing time of three to sixth months depending on the patient and the location in the mouth before external loading can be applied.

Hydroxyapatite, HA, $Ca_{10}(PO_4)_6(OH)_2$, is one of the major mineral components in animal and human bodies, and it gives hardness and strength to bone and teeth. In the body, HA exists as tiny crystals with a needle shaped structure (Lowenstam, H. A., and Weiner, S. On biomineralization, Oxford University Press, New York, 1989.). The needles are roughly 1-2 nm thick, 2-4 nm wide and 20-40 nm in length. HA is, for example, used in percutaneous devices, periodontal treatment, alveolar ridge augmentation, orthopedics, maxillofacial surgery, otolaryngology, and spinal surgery. (Hench (1991) J. Am. Cer. Soc. 74:1487), but is most extensively used for orthopedic and dental implant applications.

Unfortunately, due to low mechanical reliability, especially in a wet environment, HA cannot be used for heavy load-carrying applications by itself (Synthesis and characterization of nano-HA/PA66 composites Mie Huang, Jianqing Feng, Jianxin Wang, Xingdong Zhang, Yubao Li, Yonggang Yan Journal of Materials Science: Materials in Medicine 14 (2003) 655-660). In the body HA is incorporated into another "softer" tissue, thus forming a composite. For example, the human tooth is made up of a mixture of Collagen and HA, which makes it strong against cracking. Today, the most widespread use of synthetic hydroxyapatite is as coatings of titanium implants. This is to enhance the bonding between the implant and the surrounding tissue and to make the binding (osseointegration) as good and rapid as possible. In this application the strength of the titanium together with the biocompatibility of hydroxyapatite is utilized. Even if HA, according to studies, has a bioactive effect, problems with the application of HA have been numerous. Mostly the problems relate to the adhesion of the HA film on the titanium dioxide surface. Poor adhesion results in detachment of the HA film from the implant, which in turn may lead to a total surgical failure. Also, problems with the HA crystallinity have been experienced, leading to dissolution of the film when presented to the living tissue (Wolke J. G. C, Groot K, Jansen J. A, "In vivo dissolution behaviour of various RF magnetron sputtered Ca-P coatings", J. Biomed. Mater. Res. 39 (4): 524-530 Mar. 15, 1998.).

In recent years, research achievements have lead to an increased interest in HA as a bioactive substance and to its use as a coating on implants and other applications. Great efforts have been put into the development of new routes or modifications of old methods to produce more reliable products made of HA. One very promising approach is to make hydroxyapatite in the form of nano-particles. This is because of their ability to sinter at low temperature, their higher specific surface area and that they give stronger end products upon sintering.

Several techniques exist for the making of HA and similar materials in the nano scale. These include controlled chemical precipitation were one utilizes salt solutions of low concentration, vapor deposition techniques (both chemical and physical), condensation from gas phase and different templating techniques, both biological and synthetic. Among synthetic methods, surfactant self-assembly, especially microemulsions where the surfactants forms small water droplets which are used as micro reactors for the purpose of making small particles of HA, have been successfully applied (Susmita Bose et. al., Chem. Mater. 2003 (15) 4464-4469; Koumoulidis G C, Katsoulidis A P, Ladavos A K, Pomonis P J, Trapalis C C, Sdoukos A T, Vaimakis T C, Journal of Colloid and Interface Science 259 (2): 254-260 Mar. 15, 2003; Lim G K, Wang J, Ng S C, Gan L M Journal of Materials Chemistry, 9 (7): 1635-1639 July 1999). However, there are problems with the control of both size and morphology as well as low yield of products. Thus, there is a need for a reliable technique for the production of morphologically pure synthetic nano-sized crystalline calcium phosphate, in particular hydroxyapatite.

There are various methods for applying HA films onto implant objects. For example: a) Thermal plasma spray. During the plasma spray process plasma is produced by letting an electric arc pass through a stream of mixed gases. This results in partial melting of a HA feedstock, which in turn is hurled at a relatively high velocity hitting the outer surface of the object to be coated. This treatment gives rise to locally high temperatures, hence affecting the HA crystallinity by giving other polymorphs as well as partial amorphous HA. This amorphous HA has a tendency to dissolve in the body giving poorer osseointegration, Furthermore, the HA-layer is relatively thick (10 μm minimum), which gives problems with regard to adhesion to the implant (Cheang, P.; Khor, K. A. *Biomaterials* 1996, 17, 537; Groot, K. d.; Geesink, R.; Klein, C.; Serekian, P. *L. Biomedical. Mater. Res.* 1987, 21, 1375; Story, B.; Burgess, A. Prosthetic implants coated with hydroxylapatite and process for treating prosthetic implants plasma-sprayed with hydroxylapatite; S. Calcitek: USA, 1998; and Zyman, Z.; Weng, J.; Liu, X.; Zhang, X.; Ma, Z. *Biomaterials* 1993, 14, 225.). b) Sputtering methods, which are relatively high in cost and non-practical due to their low effectiveness (Massaro C, Baker M A, Cosentino F, Ramires P A, Klose S, Milella E , Surface and biological evaluation of hydroxyapatite-based coatings on titanium deposited by different techniques. Journal of Biomedical Materials Research, 58 (6): 651-657 Dec. 5, 2001). C) Electrochemical methods utilizing electrochemistry for growing crystals onto a substrate. This technique has problems with gas formation, which may crack and rupture the coating film. There are several other techniques that are described in the literature, but today only the plasma spray technique is used commercially. Problems utilizing these above described and other not described techniques are plentiful, especially due to that only thick layers can be applied (several μm) leading to problems with adhesion to the substrate and problems with coating objects having complicated shapes. Several of the used or tested techniques also create locally high temperatures, giving amorphous HA instead of the wanted crystalline apatite form. This asks for new coating methods for the depositions of HA onto surfaces. One promising technique is the so-called dip-coating technique where the substrate is dipped into a solution consisting of a particle dispersion. There are several studies made on the use of this technique but problems with the making of a suitable sol has resulted in problems with adhesion to the substrate as well as incoherent films.

SHORT DESCRIPTION OF THE INVENTION

The present invention provides highly crystalline nano-sized apatites, especially hydroxyapatite in the form of a powder or in the form of a coating on a surface. A thin, clean and highly crystalline apatite, i.e. calcium phosphate, such as hydroxyapatite, coating can be applied onto objects, e.g. implants, by using a method of the invention which will be detailed below.

The invention can be used for the forming of several products where the use of small particles are of an advantage.

Further, the invention provides a solution which easily can be deposited on surfaces of either metal or non-metal substrates. The nanoparticles present in the solution adheres to the substrate electrostatically, and thus the substrate should preferably have an oxide layer in order to maximize the adherence to the surface. This leads to a surface consisting of a very thin layer (such as 150 nm or less) of crystalline apatite, which can be applied irrespectively of substrate shapes. Further, the invention gives an apatite layer which can follow the surface roughness of the substrate giving the possibilities if combining surface structure and apatite-coating, which is of great importance in osseointegration.

According to materials science, upon sintering the strength of a material is increased with decreased particle size (reference: A. A. Griffith, "The phenomena of rupture and flow in solids", Phil. Trans. Roy. Soc. London, Ser. A. 221 [4] 163-198 (1920-1921)). This will lead to higher strength materials when a powder of nano-sized calcium phosphate is sintered compared with materials made from conventional HA. This enables the making of high strength implants consisting entirely of HA. Also, the small crystal size gives the possibility of making very thin layers of HA on the solid substrate. Further, hydroxyapatite nano-crystals in the form of a coating on a surface are advantageous when using them to increase the surface area of implants made of metals or non-metal as well as giving a bioactive surface. This will result in a quicker and more controlled osseointegration.

The synthetic nano-sized crystals of hydroxyapatite of the invention have, to our knowledge, the highest specific surface area ever presented. They resemble the HA particles that are present in the living body, which make them highly suitable in the biomimicking of body tissue for the making of body implants. Thus, the HA of the invention is suitable for being deposited on the surface of an implant giving it a highly bioactive surface in order to stimulate the bone growth during the initial healing process. For example, the human tooth is made out of nanoparticles consisting of HA embedded in a matrix of the protein polymer Collagen, which gives them the right mechanical strength and stability.

DETAILED DESCRIPTION OF THE INVENTION

A first aspect of the invention is directed to synthetic nano-sized crystalline calcium phosphate with a specific surface area in the range of 150 $m^2/g$ to 300 $m^2/g$, such as 180 $m^2/g$ to 280 $m^2/g$ as measured by the BET method (S. Brunauer, P. H. Emmet, E. Teller, *J. Am. Chem. Soc.* 1938, 60, 309-319).

Figure 1:
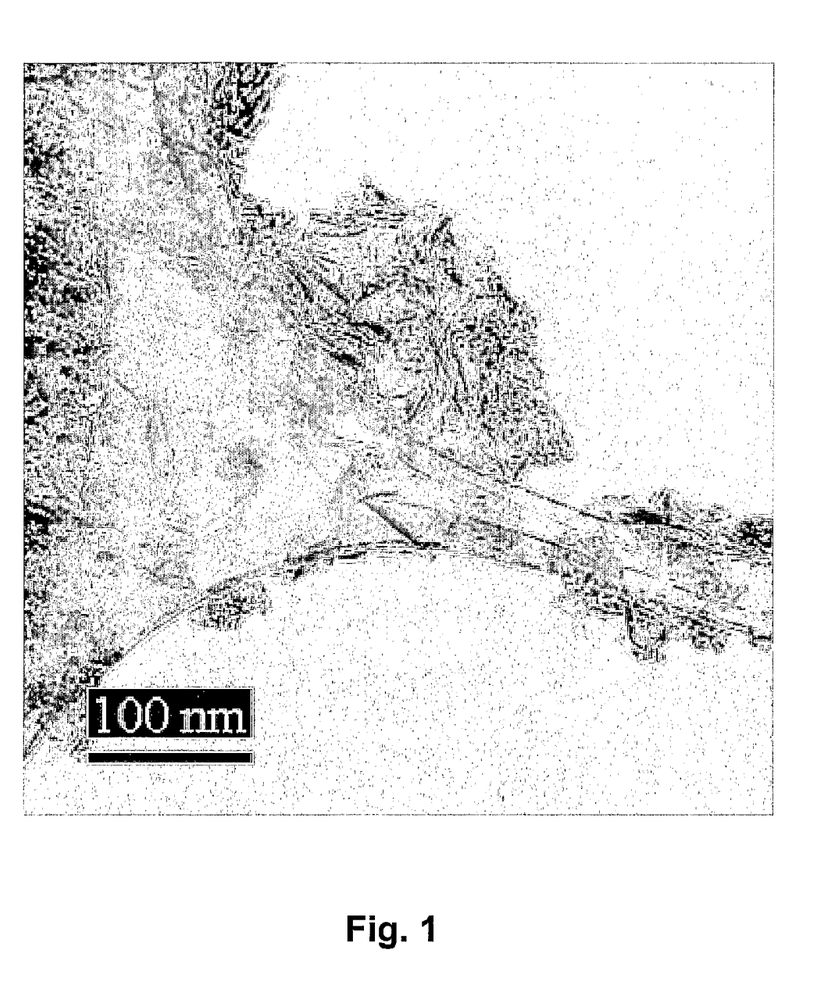
FIG. 1 shows a Transmission Electron Microscope (TEM) image of hydroxyapatite crystals of the invention. Scale bar=100 nm.
Figure 2:
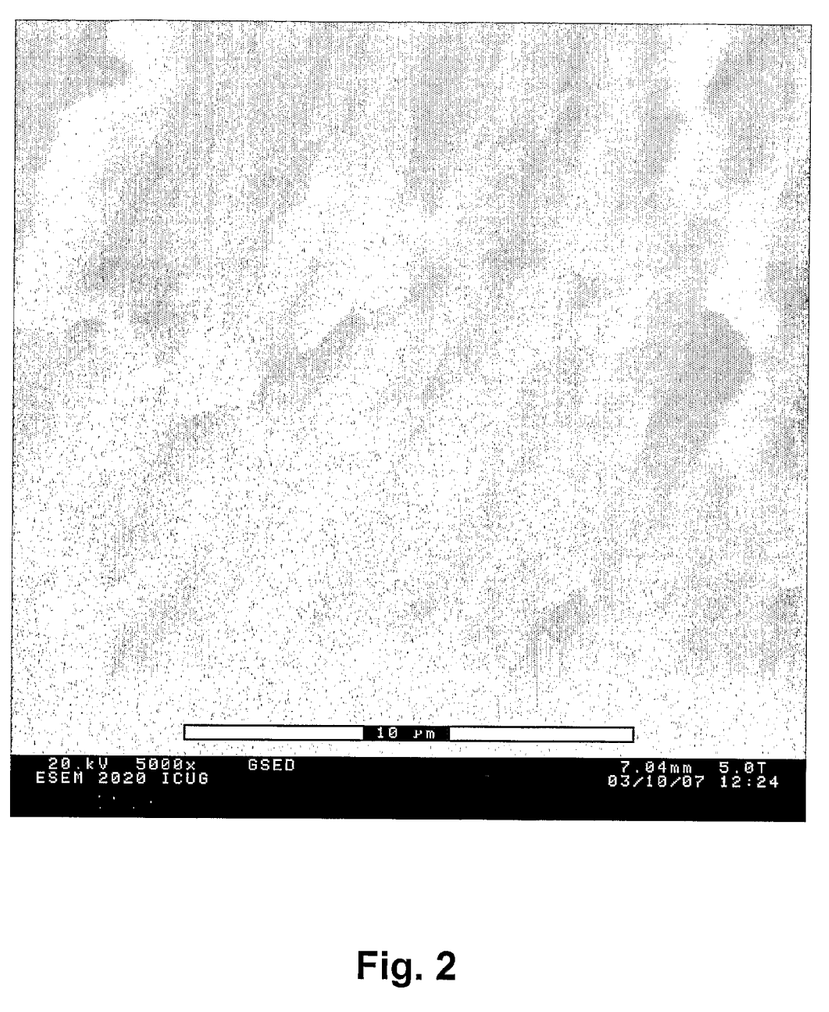
FIG. 2 shows a Scanning Electron Microscope (SEM) image of a metal surface coated with hydroxyapatite of the invention. As
   can be seen from this picture, the hydroxyapatite layer of
      the invention follows the topography of the metal surface. Scale bar=10 μm."
Figure 3:
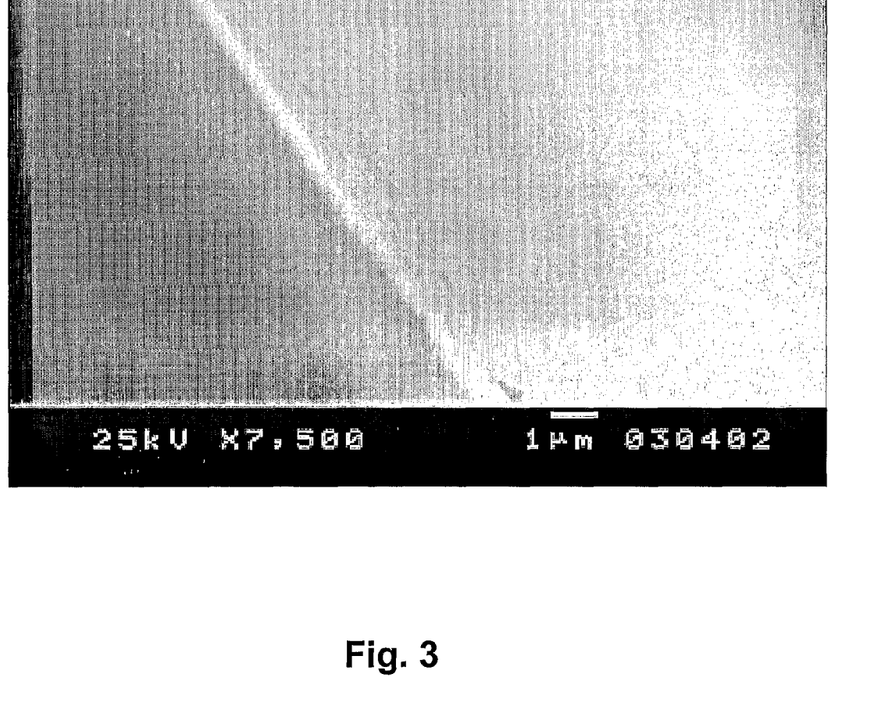
FIG. 3 shows a SEM image of a hydroxyapatite layer of the invention on a glass surface.
   Scale bar=1 μm.
Figure 4:
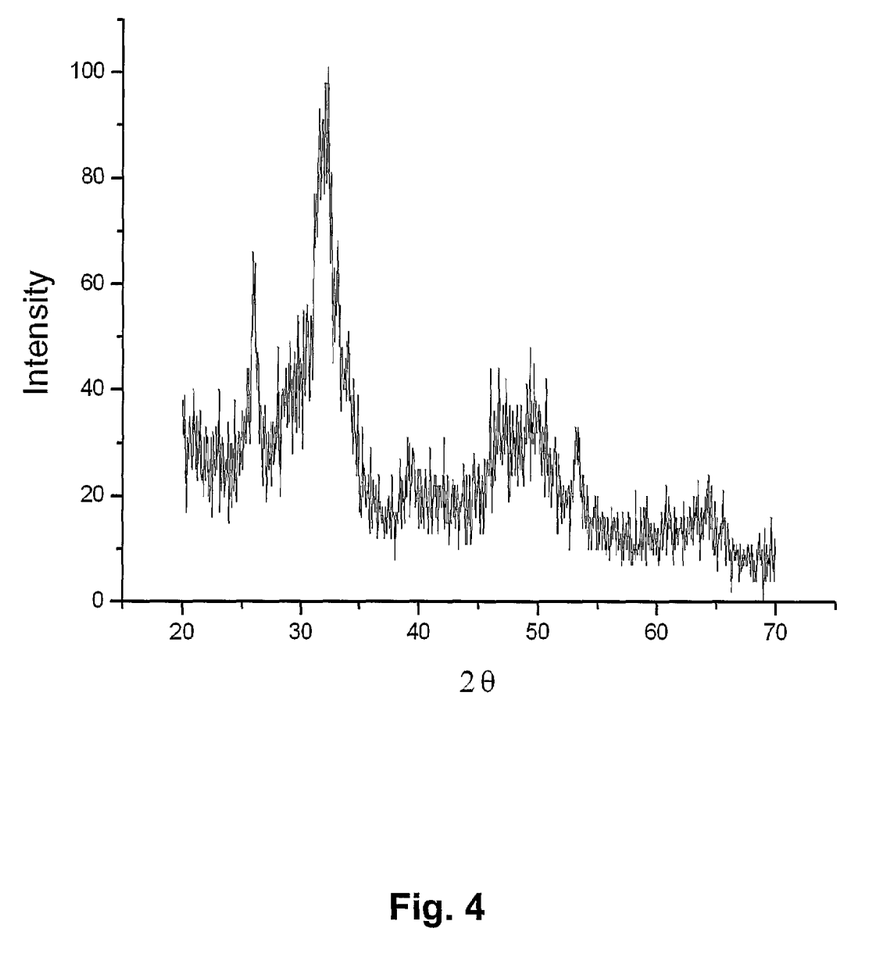
FIG. 4 shows an X-Ray diffractogram of a HA powder with a specific surface area of 220 $m^2/g$.

The crystals have an average particle size of 1-10 nm, such as 2-10 nm, and preferably 1-5 nm in diameter, and 20-40 in length, which can be estimated from the TEM image shown in FIG. 1.

In a preferred embodiment of the synthetic nano-sized crystalline calcium phosphate of the invention, the calcium phosphate is hydroxyapatite.

In another embodiment the synthetic nano-sized crystalline calcium phosphate of the invention, the specific surface area is selected from 180 $m^2/g$, 220 $m^2/g$ and 280 $m^2/g$, The synthetic nano-sized crystalline calcium phosphate according to the invention may be in the form of a powder or in the form of a coating on a surface, e.g. a metal surface, such as a titanium surface.

In an embodiment of the synthetic nano-sized crystalline calcium phosphate in the form of a coating on a surface, the coating has a thickness of less than or equal to 150 nm, such as less than or equal to 100 nm.

In yet another embodiment of the synthetic nano-sized crystalline calcium phosphate of the invention, the calcium to phosphor ratio is 1.67.

A second aspect of the invention is directed to a method of producing a powder or coating of nano-sized crystalline calcium phosphate comprising the steps of a) providing a solution of water and stoichiometric solved amounts of a phosphor precursor and of a calcium salt precursor, b) adding a surfactant, and optionally a hydrophobic organic solvent, to the solution of a) to create a liquid crystalline phase, c) allowing the liquid crystalline phase to equilibrate, and d) placing the equilibrated liquid crystalline phase in an ammonia atmosphere to raise the pH so that nano-sized crystals of calcium phosphate are formed in the water domains of the liquid crystalline phase, the steps a)-d) being performed at ambient temperature, followed by either e1) removing the surfactant from the ammonia-treated liquid crystalline phase in d) with a solvent and f1) filtering, washing and drying the nano-sized crystals of calcium phosphate to obtain the powder, or e2) diluting the ammonia-treated liquid crystalline phase in d) with a hydrophobic organic solvent to create a microemulsion of the nano-sized crystals of calcium phosphate in water, f2) dipping an oxide layer-coated surface of an object into the microemulsion of e2) to deposit the microemulsion onto the surface, g2) evaporating the organic solvent from the surface of f2) to obtain the coating of nano-sized crystalline calcium phosphate, and h2) heating under inert atmosphere in order to remove the surfactant, or alternatively omitting step d) and e3) diluting the liquid crystalline phase of c) with a hydrophobic organic solvent to create a microemulsion, f3) dipping an oxide layer-coated surface of an object into the microemulsion of e3) to deposit the microemulsion onto the surface, g3) evaporating the organic solvent from the surface of f3) to form the liquid crystalline phase, where the dissolved precursors are situated in the water domains and h3) placing the surface of g3) in an ammonia atmosphere to raise the pH so that nano-sized crystals of calcium phosphate are formed in the water domains of the liquid crystalline phase and are deposited on the surface, followed by i2) heating under inert atmosphere in order to remove the surfactant.

In an embodiment the stoichiometric solved amounts in a) are water-solved amounts, but in some other embodiments where the phosphor precursor is not water-soluble, e.g. triethyl phosphite or calcium propionate, the solved amounts are tenside-solved or oil-solved, respectively.

In a presently preferred embodiment the surfactant in b) is a non-ionic surfactant.

By the method of the invention, it is possible to produce nano-sized crystalline calcium phosphate having a specific surface in the range of 50 $m^2/g$ to 300 $m^2/g$, even though a presently preferred range is 150 $m^2/g$ to 300 $m^2/g$.

In an embodiment of the method of the invention, the oxide layer-coated surface of f2) or f3) is a metal surface, such as a titanium surface.

In another embodiment, the object of f2) or f3) is a body implant, for example a dental implant.

As in the first aspect of the invention, embodiments in the second, method, aspect of the invention comprise the calcium phosphate as hydroxyapatite, the phosphor precursor as phosphoric acid, the calcium salt precursor as calcium nitrate, and the calcium to phosphor ratio as 1.67.

Thus, the important Ca/P ratio, which in the body is in the order of 1.67 can also be retained. The Ca/P ratio of 1.67 is the ratio of naturally occurring hydroxyapatite. However, other calcium phosphate compounds can be produced according to the invention by altering the ratio of the calcium and phosphor precursors, such as di-, tri- or tetracalcium phosphate.

Examples of the phosphor precursors include, in addition to phosphoric acid, phosphorous acid, hypophosphorous acid and phosphorous acid esters, such as triethyl phosphite.

Examples of the calcium salt precursor include, in addition to calcium nitrate, for example calcium chloride, calcium acetate, and calcium alkoxides such as calcium ethoxide The synthetic nano-sized crystalline calcium phosphate, in particular hydroxyapatite, can be deposited on any surface of interest such as for example metals, polymers and any other organic materials, ceramics and other inorganic materials, as long as they have an oxide-layer. The object or implant may be flat like, round, concentric or of any complex shape, and the surface can be either smooth or porous. Metals used as body implants, such as titanium (which always has a titanium dioxide layer present on the surface), stainless steel, molybdenum, zirconium etc., can hence be bioactivated by the coating action described by this invention.

In order to get good adhesion to the substrate, the substrate surface should be properly cleaned. This is to get rid of contaminants that might influence the binding. Several techniques can be utilized for this purpose, both mechanical, such as blasting and polishing, and chemical, such as washing with organic solvents and water.

In order to control the crystal size as well as getting its desired crystallinity, i.e. its apatite structure, surfactant self-assembly has been utilized in the method of the invention. Surfactants are amphiphilic molecules consisting of one or more hydrophilic part and one ore more hydrophobic part. The hydrophilic part means that it is lyophilic towards water, i.e. is water loving, which also is referred to as the head is more or less water soluble. The hydrophobic part means that it is non-lyophilic towards water, i.e. not water loving, which often is referred to as the tail is not water soluble or less water soluble than the hydrophilic part. Combinations of these different parts result in molecules having one part soluble in water and one part not soluble in water or less soluble in water. Different compositions exist between these parts, and surfactants can be for example double headed with one or more hydrophobic tail, or the opposite, a double tailed molecule with one ore more head. Further, surfactants are divided into different groups depending on the type of head, i.e. ionic or non-ionic, the ionic being positive, negative, zwitterionic or amphoteric. Zwitterionic surfactants contain both a positive and a negative charge. Often the positive charge is invariably ammonium and the negative charge may vary, but usually it is a carboxylate. If both the positive and negative charge are dependent on the pH, they are referred to as amphoteric surfactants, which in a certain pH range is zwitterionic. The most important feature of surfactants are their tendency to adsorb on interfaces, for example the air-liquid interface, air-solid interface and liquid-solid interface. When the surfactants are free in the sense of not being in an aggregated form, they are called monomers or unimers. When increasing the unimer concentration they tend to aggregate and form small entities of aggregates, so-called micelles. This concentration is called the Critical Micelle Concentration and is often denoted as the CMC. This micelle formation can be viewed as an alternative to adsorption on an interface, hence reducing its free energy according to the rules of thermodynamics. When using water as the solvent for the micellization, the CMC is reached at very low micelle concentrations. It is not unusual with values of 1 mM and below. Increasing the surfactant concentration further beyond the CMC the micelles starts to grow in size. At higher surfactant concentration the micelles reach the stage when they start to pack close to each other forming new, more viscous, structures, i.e. liquid crystalline phases. These entities are formed in water or organic solvents or in mixtures of water and organic solvents.

Surfactant self-assembly in the form of liquid crystalline structures exists in a range of different geometries. Examples of these geometries are lamellar, hexagonal, reversed hexagonal and cubic. All of these geometries are possible to obtain with the present invention. Other surfactant phases that exist are the so-called isotropic solution phases, and examples of these are dilute and concentrated micellar solutions, reversed micellar solutions, microemulsions and vesicle solutions. The more highly concentrated systems, i.e. liquid crystalline phases, have a short-range disorder but some order at larger distances. This compared to ordinary crystals such as inorganic crystals that have both a long as well as a short-range order. These properties make the liquid crystals a rigid structure, but more liquid-like compared to ordinary crystals. The typical size-ranges for these structures are in the meso range, i.e. 2-50 nm.

The method of using liquid crystalline phases and their rich phase behavior makes it a very promising route also for making porous materials (mesoporous), which would be interesting in the application of replacing damaged bone. The materials made utilizing the highly concentrated liquid crystalline phase have a specific surface area of more than 50 $m^2/g$, such as 100 $m^2/g$, preferably more 150 $m^2/g$, e.g 200 $m^2/g$ and most preferably 280 $m^2/g$, which to our knowledge is the highest reported surface area for synthetic HA utilizing the conventional $N_2$ adsorption method (It should be noted that Rudin et. al. (WO 02/02461) stated that they have made HA with a specific surface area of 920 $m^2/g$. However, these values are not comparable to values obtained with the standard $N_2$ adsorption method).

The surfactant used in the present invention as a structure directing agent for the formation of the crystalline apatite, e.g. HA, particles, may also function as a dispersing agent stabilizing the colloidal suspension, and as wetting agent in case dispersion of the particles onto an object is wanted. Suitable surfactants for the production of nano-sized calcium phosphates are the non-ionic surfactants of the type block-poly-ethylene glycol)-block-poly(propylene glycol)-block-poly (ethylene glycol). As mentioned above, there exist several different lyotropic liquid crystalline structures or phases. The type of phase one will get depends on the surfactant, hydrophobic phase (if present), applied pressure, temperature, pH and concentrations, and it is possible to shift phase by changing one or more of these parameters. This feature makes it possible to start with one specific surfactant phase, carry out the desired reaction in that specific embedded environment, and change one or more parameters to convert into another phase. This other phase may have other properties wanted for the production procedure, which can be utilized in another further step. By changing parameters such as temperatures and surfactant concentrations it is possible to produce the desired phase and by the invention presented nano-particles, and to shift to another phase more desirable as a stable suspension. Further, making these surfactant systems under known conditions thermodynamically, systems can be achieved and retained. This means that the phase never will phase separate into its own respective components even if it is stored for a long time. This is a desired property when it comes to practical issues such as product and production reproducibility.

The possibly used organic solvent may be selected from a large number of different solvents, and examples of solvents include butylacetate and p-xylene.

The invention will now be illustrated with reference to Examples and the Drawings, but it should be understood that the scope of the invention is not limited to the disclosed details.

EXAMPLES

Example 1

Production of Hydroxyapatite Powder

The powder is manufactured using a liquid crystalline phase. Such a phase is built-up of surfactants, water and optionally a hydrophobic phase that is an organic solvent. The surfactants that we have used are so-called block co-polymers of the structure PEG-PPG-PEG (block poly (ethylene glycol)-block poly (propylene glycol)-block poly (ethylene glycol)). BASF manufactures this polymer series under the name Pluronic, but the chemical company Aldrich also sells almost identical block co-polymers. We have managed to manufacture hydroxyapatite by four different recipes, given in percent by weight:
1) Reverse hexagonal phase
   15% Water solution: $H_2O$, $H_3PO_4$ and $Ca(NO_3)_2$
   35% butylacetate
   50% Pluronic P123
2) Reverse hexagonal phase
   15% Water solution: $H_2O$, $H_3PO_4$ and $Ca(NO_3)_2$
   15% p-xylene
   70% Pluronic L64
3) Cubic phase
   50% Water solution: $H_2O$, $H_3PO_4$ and $Ca(NO_3)_2$
   50% Pluronic F127
4) Hexagonal phase
   30% Water solution: $H_2O$, $H_3PO_4$ and $Ca(NO_3)_2$
   70% Pluronic F127

The liquid crystalline phase is allowed to equilibrate for some hours before it is treated in an ammonia atmosphere. The ammonia precipitates the hydroxyapatite since the pH of the water domains is raised. In four days the reaction has ceased and the surfactant is removed with a solvent (e.g. ethanol or toluene). The hydroxyapatite is filtered, washed and air-dried. Due to the fact that the crystallization occurs in the very small water domains that are present in the liquid crystalline phase (5-10 nm in diameter) the powder becomes extremely fine-grained.

As can be seen from the recipes, soluble concentrations of phosphoric acid and calcium nitrate are added to the aqueous phase. The relationship between the calcium nitrate and the phosphoric acid has always been made such that the Ca/P ratio has been 1.67. Depending on which concentrations of calcium nitrate and phosphoric acid are added the size of the resulting hydroxyapatite crystals can be controlled. We have varied the concentrations of calcium nitrate and phosphoric acid (still with the Ca/P ratio of 1.67) and measured the following specific surface areas:

| $Ca(NO_3)_2 * 4H_2O$ | Specific surface area, $m^2/g$ |
| --- | --- |
| 20 wt % | 80 |
| 10 wt % | 180 |
| 5 wt % | 220 |
| 2.5 wt % | 280 |

All specific surface areas mentioned in this text have been measured with nitrogen gas adsorption, more specifically with a ASAP 2010 instrument from Micromeritics instruments.

Example 2

Production of A Coating On A Surface—Method 1

The coating is obtained by diluting the ammonia treated liquid crystalline phase with an organic solvent that has to be insoluble in water. Instead of removing the surfactants and filter the powder as in Example 1, more of the water insoluble component is added to the liquid crystalline phase. In such a way a so-called water-in-oil microemulsion is obtained, wherein the hydroxyapatite crystals exist in small water droplets in the solution, approximately 10 nm in diameter. The amount of solvent that is added is important in order to retain the microemulsion. If too much solvent is added the hydroxyapatite will precipitate and sediment. In the recipe with p-xylene and L64 we have added double the amount of p-xylene compared to the weight of the the liquid crystalline phase in order to get a microemulsion:
15 g Aqueous solution
215 g p-xylene
70 g Pluronic L64

When a metal such as titanium is dipped into the solution, the hydroxyapatite will attach to the metal, together with the surfactant and the organic solvent. After the dipping, the sample is dried for half an hour, so that the organic solvent evaporates. As the surfactant subsequently is burned away at 550° C. in 5 minutes, only pure hydroxyapatite remains. The hydroxyapatite will be completely crystalline and moreover have a high specific surface area. With other methods, such as plasma sputtering, a thick layer of partly amorphous hydroxyapatite is obtained together with a low specific surface. Our heat-treatment is conducted in a so-called tube-type furnace, with nitrogen gas flowing past the sample and thereby preventing further oxidation of the titanium surface.

The above method of producing a HA coating can be described in short as follows:
1. The liquid crystalline phase is produced and
2. it is placed in an ammonia atmosphere for 4 days.
3. The phase is diluted with a solvent to create a coating solution.
4. The surface to be coated is dipped into the coating solution and dried, so that the liquid liquid crystalline phase is recreated at the surface
5. The surface is placed in a furnace under nitrogen gas for 5 minutes for removal of the surfactant Example 3

Production of A Coating On A Surface—Method 2

The coating is obtained by diluting the liquid crystalline phase, which has not been treated in an ammonia atmosphere, with an organic solvent that has to be insoluble in water. A water-in-oil microemulsion is obtained, but since the liquid crystalline phase has not been exposed to ammonia, no hydroxyapatite crystals are present in the water droplets of the microemulsion. Instead these water droplets contain the calcium and phosphor precursors. The composition of the microemulsion is identical to the one in example 2:
15 g Aqueous solution
215 g p-xylene
70 g Pluronic L64

The above method of producing a HA coating can be described in short as follows:
1. The liquid crystalline phase is produced and
2. it is diluted with a solvent to create a coating solution.
3. The surface to be coated is dipped into the coating solution and dried, so that the liquid crystalline phase is recreated at the surface and
4. it is placed in an ammonia atmosphere for 20 minutes.
5. The surface is placed in a furnace under nitrogen gas for 5 minutes for removal of the surfactant.

The main difference between the two alternative methods of producing a nano-crystalline coating on a surface is that in the latter case the liquid crystalline phase is not treated with ammonia for 4 days. Instead the surface is treated with ammonia after the dipping, the pH is raised and HA is deposited on the surface. The final step of removing the surfactants in a furnace is the same in both methods. The methods give the same result, but the latter method is performed in a shorter time.

It is possible to coat other surfaces than metal surfaces with hydroxyapatite provided there is an oxide layer on the surface (otherwise the hydroxyapatite in the microemulsion will not attach to the substrate satisfactorily) and that the material will withstand thermal treatment. Examples of materials amenable for coating with HA include metals such as stainless steel and titanium, and ceramics such as zirconium oxide and ordinary glass.

The invention claimed is:

1. A synthetic nano-sized crystalline calcium phosphate having a specific surface area in the range of 50 $m^2/g$ to 300 $m^2/g$, wherein the synthetic nano-sized crystalline calcium phosphate is in the form of a coating on a non-metal surface, the coating having a thickness of less than or equal to 150 nm.

2. The synthetic nano-sized crystalline calcium phosphate of claim 1, wherein the coating consists of calcium phosphate and the surface is a polymer.

3. The synthetic nano-sized crystalline calcium phosphate of claim 1, wherein the coating consists of calcium phosphate and the surface is a ceramic.

4. The synthetic nano-sized crystalline calcium phosphate of claim 1, wherein the calcium phosphate coating consists of hydroxyapatite.

5. The synthetic nano-sized crystalline calcium phosphate of claim 1, wherein the specific surface area is selected from the group consisting of 180 $m^2/g$, 220 $m^2/g$ and 280 $m^2/g$.

6. A method of producing a coating of the synthetic nano-sized crystalline calcium phosphate of claim 1, comprising the steps of:
- a) providing a solution of water and stoichiometric solved amounts of a phosphor precursor and of a calcium salt precursor,
- b) adding a surfactant, and optionally a hydrophobic organic solvent, to the solution of a) to create a liquid crystalline phase,
- c) allowing the liquid crystalline phase to equilibrate, and
- d) placing the equilibrated liquid crystalline phase in an ammonia atmosphere to raise the pH so that nano-sized crystals of calcium phosphate are formed in the water domains of the liquid crystalline phase, the steps a)-d) being performed at ambient temperature followed by
- e1) diluting the ammonia-treated liquid crystalline phase of d) with a hydrophobic organic solvent to create a microemulsion of the nano-sized crystals of calcium phosphate in water,
- f1) dipping an oxide layer-coated surface of an object into the microemulsion of e1) to deposit the microemulsion onto the surface,
- g1) evaporating the organic solvent from the surface of f1) to obtain the coating of nano-sized crystalline calcium phosphate, and
- h1) heating under inert atmosphere in order to remove the surfactant or alternatively omitting step d) and
- e2) diluting the liquid crystalline phase of c) with a hydrophobic organic solvent to create a microemulsion,
- f2) dipping an oxide layer-coated surface of an object into the microemulsion of e2) to deposit the microemulsion onto the surface,
- g2) evaporating the organic solvent from the surface of f2) to form a liquid crystalline phase, and
- h2) placing the surface of g2) in an ammonia atmosphere to raise the pH so that nano-sized crystals of calcium phosphate are formed in the water domains of the liquid crystalline phase and are deposited on the surface, followed by
- i2) heating under inert atmosphere in order to remove the surfactant.

7. The synthetic nano-sized crystalline calcium phosphate of claim 2, wherein the calcium phosphate coating consists of hydroxyapatite.

8. The synthetic nano-sized crystalline calcium phosphate of claim 2, wherein the specific surface area is selected from the group consisting of 180 $m^2/g$, 220 $m^2/g$ and 280 $m^2/g$.

9. The synthetic nano-sized crystalline calcium phosphate of claim 3, wherein the calcium phosphate coating consists of hydroxyapatite.

10. The synthetic nano-sized crystalline calcium phosphate of claim 3, wherein the specific surface area is selected from the group consisting of 180 $m^2/g$, 220 $m^2/g$ and 280 $m^2/g$.

* * * * *